(12) United States Patent
Graves et al.

(10) Patent No.: US 8,410,947 B1
(45) Date of Patent: Apr. 2, 2013

(54) LEAK DETECTION SYSTEM FOR PRESSURIZED PIPELINE

(76) Inventors: John G. Graves, Broken Arrow, OK (US); Edward H. Short, III, Tulsa, OK (US)

( * ) Notice: Subject to any disclaimer, the term of this patent is extended or adjusted under 35 U.S.C. 154(b) by 475 days.

(21) Appl. No.: 12/822,714

(22) Filed: Jun. 24, 2010

Related U.S. Application Data

(60) Provisional application No. 61/220,028, filed on Jun. 24, 2009.

(51) Int. Cl.
*G08B 21/00* (2006.01)

(52) U.S. Cl. ........................................................ 340/605

(58) Field of Classification Search .................. 340/605, 340/603, 606, 611, 626; 73/40, 49.5
See application file for complete search history.

(56) References Cited

U.S. PATENT DOCUMENTS

| | | | |
|---|---|---|---|
| 5,117,676 A * | 6/1992 | Chang | 73/40.5 A |
| 5,580,103 A * | 12/1996 | Hall | 285/93 |
| 5,918,268 A * | 6/1999 | Lukas et al. | 73/40.5 R |
| 6,082,182 A * | 7/2000 | Fierro et al. | 73/40.5 R |
| 6,549,857 B2 * | 4/2003 | Fierro et al. | 702/51 |
| 7,668,670 B2 * | 2/2010 | Lander | 702/51 |
| 7,716,967 B2 * | 5/2010 | Woods et al. | 73/46 |
| 2004/0237632 A1 * | 12/2004 | Van Keeken | 73/46 |

* cited by examiner

*Primary Examiner* — Phung Nguyen
(74) *Attorney, Agent, or Firm* — Head, Johnson & Kachigian, P.C.

(57) ABSTRACT

A leak detection system for a pressurized pipeline used in conjunction with a fluid control valve having an electric actuator or with an alarm signaling device. The leak detection system includes a chamber surrounding the pipeline. A normally flat or planar thin sheet of material has a pair of opposed ends brought together to form a cylinder around the pipeline so that the sheet has a spring force when in a cylindrical position to a normal flat position. A seal between the cylinder and the pipeline forms a closed chamber around the pipeline. At least one fastener holds the opposed ends of the sheet together in the cylindrical position unless the force overcomes the fastener. A switch detects movement of the cylinder toward the flat position and the switch is connected to the actuator in order to close the valve.

17 Claims, 4 Drawing Sheets

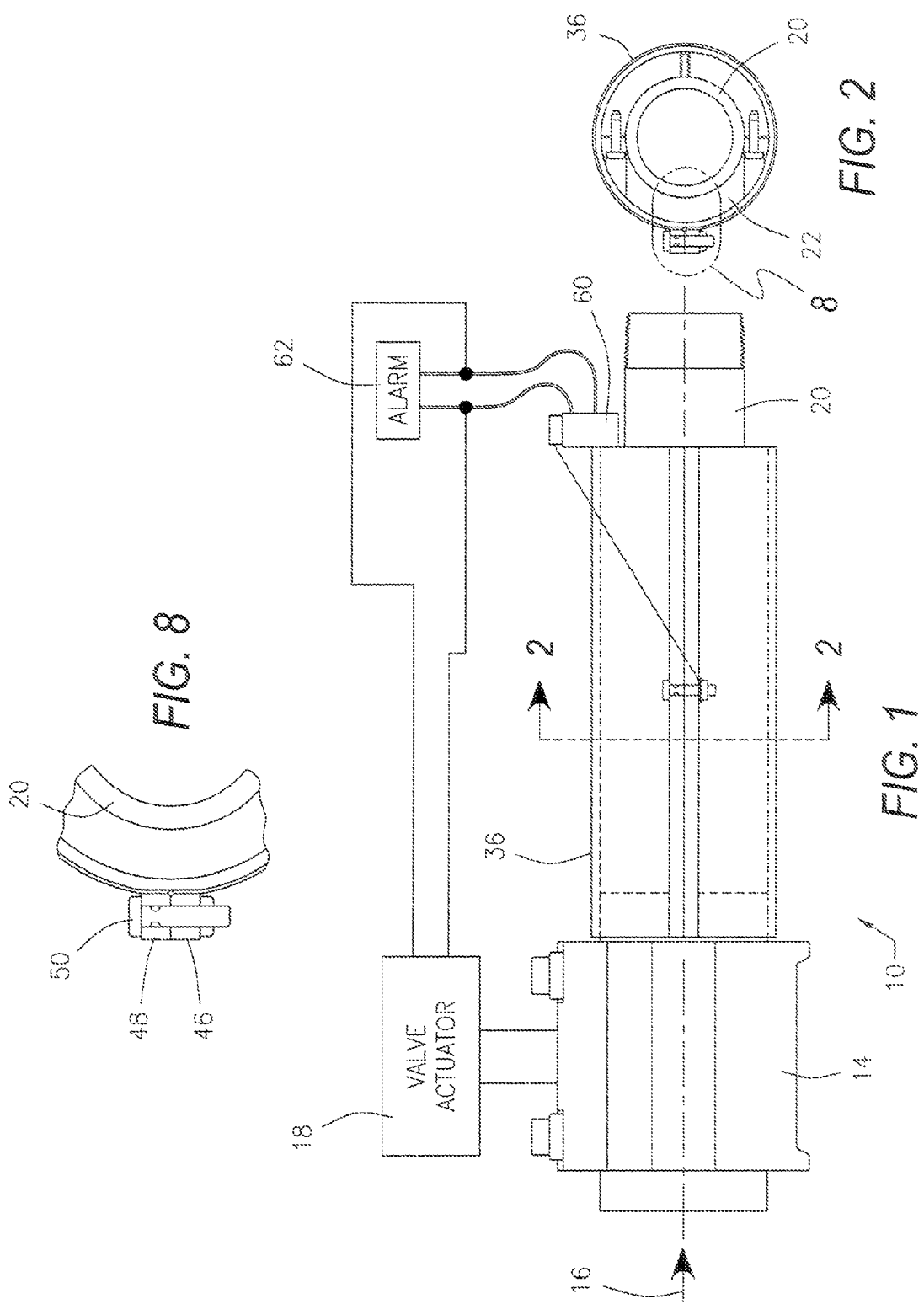

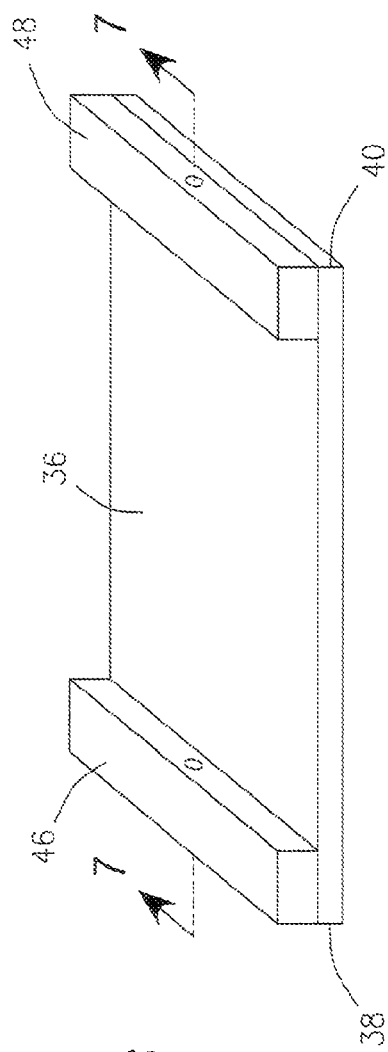
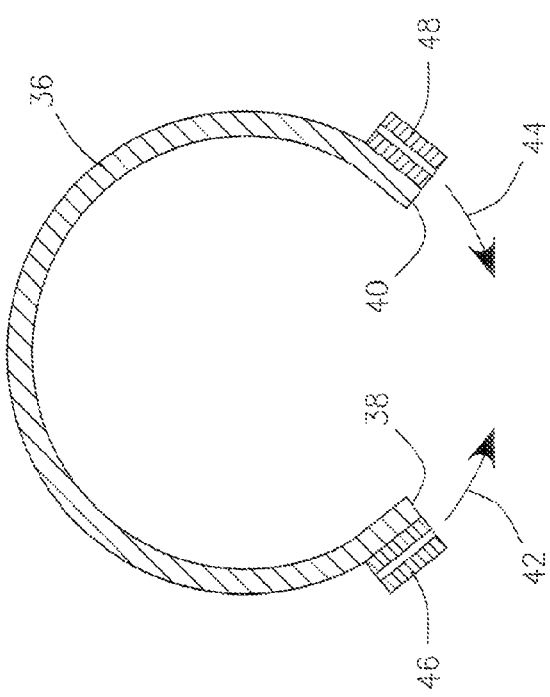

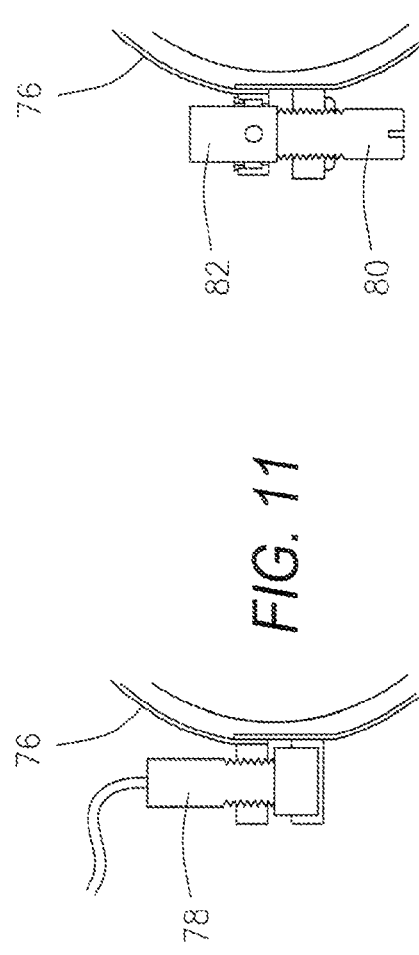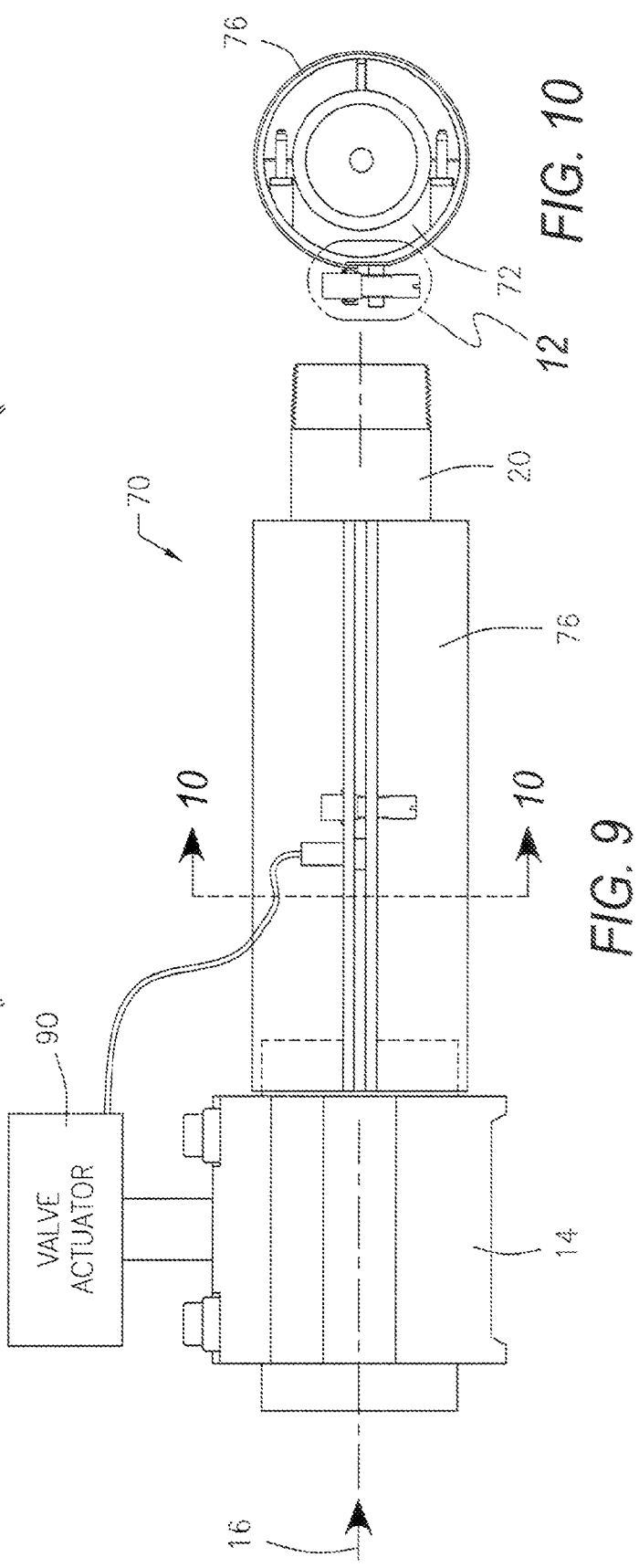

US 8,410,947 B1

LEAK DETECTION SYSTEM FOR PRESSURIZED PIPELINE

CROSS-REFERENCE

This application claims priority to U.S. Provisional Patent Application Ser. No. 61/220,028, filed Jun. 24, 2009, incorporated in its entirety herein by reference.

BACKGROUND OF THE INVENTION

1. Field of the Invention

The present invention relates to a leak detection system for a pressurized pipeline in order to detect a leak and transmit a signal in order to close a valve.

2. Prior Art

A wide variety of fluid control valves are employed in pipeline fluid transfer applications and in oil and gas well site applications. While the fluid control valves may be manually opened and shut, electric, pneumatic or hydraulic actuators may be utilized with the valves to automatically open and close them. Electric actuators typically include an AC electric motor, reduction gearing, travel limiting devices, and controls to switch the electric motor on or off.

Downstream from the valve, a pipeline would be connected to move pressurized fluid, such as natural gas. Many pipelines and wells operate at high pressure, such as from 2000 to 3000 pounds per square inch (psi). Depending on the conditions encountered, various pipelines and wells produce and transport sand along with the fluid. For example, during production of natural gas from a subterranean formation, a certain amount of sand is delivered to the surface and then transported through the pipelines. When a valve is partially opened, fluid exiting the valve to the pipeline is diverted from normal axial flow and is caused to move radially outward. This causes the sand to impinge against the interior of the pipeline wall. Over time, sand can erode the inside wall of the pipeline. The pipeline immediately downstream from the valve will tend to wear more than other locations because of the passage of the fluid through the valve.

Because the wells and pipelines are often in remote locations, there may not be constant visual inspection from personnel. Accordingly, a leak or rupture can continue for a time period before being discovered.

While there are various leak detection systems which have been established in the past, there remains a need for a simple leak detection system which could be used as an adjunct to and along with existing fluid control valves and their actuators.

Accordingly, it is a principal object and purpose of the present invention to provide a leak detection system which can operate with existing fluid control valves.

It is a further object and purpose of the present invention to provide a leak detection system that may be easily added to existing fluid control valves and actuators.

BRIEF DESCRIPTION OF THE DRAWINGS

FIG. 1 illustrates a side view of a first preferred embodiment of a leak detection system for a pressurized pipeline as set forth in the present invention;

FIG. 2 illustrates a sectional view taken along section line 2-2 of FIG. 1;

FIGS. 6 and 7 show alternate position views of a sheet forming a cylinder for the leak detection system of the present invention shown in FIG. 1;

FIG. 8 is an enlarged view of a portion of the elements shown in FIG. 2;

FIG. 9 illustrates a side view of an alternate preferred embodiment of a leak detection system for a pressurized pipeline;

FIG. 10 illustrates a sectional view taken along section line 10-10 of FIG. 9; and FIGS. 11 and 12 illustrate alternate views of the leak detection system for a pressurized pipeline shown in FIG. 9.

DETAILED DESCRIPTION OF THE PREFERRED EMBODIMENTS

Figure 5:
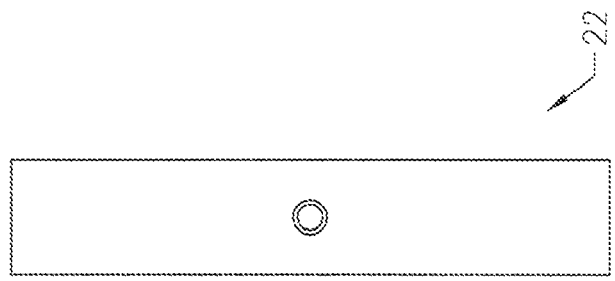
FIGS. 3, 4 and 5 illustrate alternate views of a collar of the leak detection system of the present invention shown in FIG. 1.

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Referring to the drawings in detail, FIG. 1 illustrates a leak detection system 10 for a pressurized pipeline which would be used in conjunction with a fluid control valve 14. Fluid flow through the valve 14 is in the direction shown by arrow 16.

The present invention may be used with a wide variety of valves, such as, but not limited to, multiple orifice valves, ball valves or plug valves. Valves might be employed in pipeline applications to transport fluids, such as natural gas, and might also be used in well site applications, such as production of natural gas. The valve 14 would operate with an actuator (shown in diagrammatic form by box 18) which automates the operation of the valve. The actuator is capable of moving the valve between an open and closed position. In the case of an electric actuator, typical known components include an AC electric motor, reduction gearing, travel limiting devices, and controls to switch the motor on and off. While the preferred embodiments herein are described with an electric actuator, it will be understood that other actuators might be employed within the spirit and scope of the present invention.

Downstream from the valve 14 is a pipe or pipeline 20 in fluid communication therewith so that fluid passing through the valve 14 passes into and through the pipeline 20.

Figure 3:
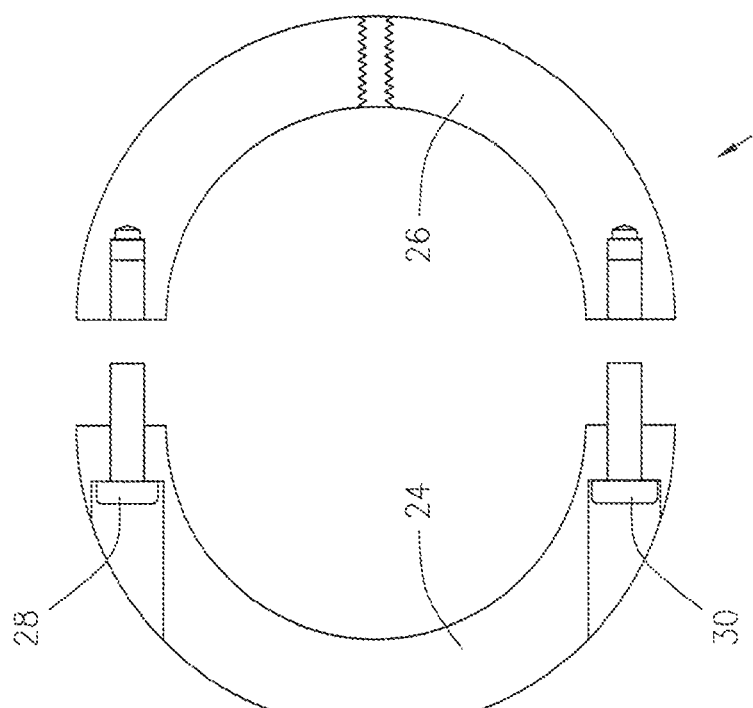
Figure 4:
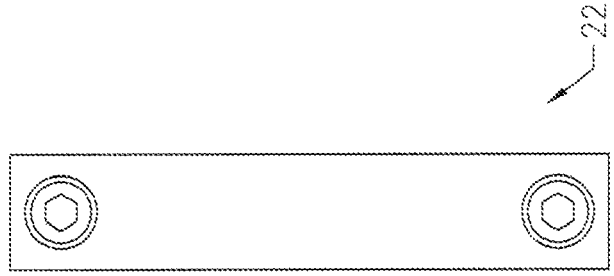

As seen in the sectional view in FIG. 2, a split collar 22 is installed surrounding the outer circumference of the pipe 20 downstream from the valve. The split collar 22 is shown in detail apart from the assembly in FIGS. 3, 4 and 5. The split collar 22 may be composed of two half circles 24 and 26, held together by fasteners, such as bolts or screws 28 and 30.

Accordingly, the split collar 22 and the present leak detection system may be installed after installation of the valve 14 and the pipeline.

Returning to a consideration of FIGS. 1 and 2, the system of the present invention includes a normally flat or planar, thin sheet of material 36. A perspective view of the sheet 36 prior to installation is shown in FIG. 6. The material is normally flat or planar and has a pair of opposed ends 38 and 40. In order to install the system, the ends 38 and 40 are brought together to form a cylinder as shown in FIG. 7. The movement of the sheet is illustrated by the arrows 42 and 44.

The sheet 36 would be composed of pliable, resilient material, such as thin stainless steel, so that when the material 36 is brought from the flat or planar position into the cylindrical position shown in FIG. 7, it has a spring force tending to move the sheet 36 back to the normally flat or planar position shown in FIG. 6. Other types of pliable, resilient material are, of course, possible.

Each opposed end 38 and 40 also includes a receptacle 46 and 48, respectively. Each receptacle 46 and 48 has an opening therethrough. When the ends 38 and 40 are brought together, the openings in the receptacles 46 and 48 will align with each other.

The cylinder formed by the sheet 36 is spaced from the pipeline 20 by one or more of the split collars 22, by the exit end of the valve 14, or by another mechanism so that a closed chamber is formed between the pipeline 20 and the sheet 36. A cylinder is formed by the material 36 around the pipeline 20 so that the cylinder is spaced from the pipeline 20 and is coaxial therewith.

A seal will be formed between the collar 22 and the cylinder in order to form a closed chamber surrounding the pipeline 20. Silicone or other material may be inserted between the collar and cylinder to assist in forming a seal.

Returning to a consideration of FIG. 1 and an enlarged, detailed view in FIG. 8, a fastener 50 holds the opposed ends 38 and 40 of the sheet 36 in the cylindrical position around the pipeline 20 as shown in FIG. 1. The fastener 50 passes through the openings in the receptacles 46 and 48. The fastener 50 may be a plastic screw and nut which has a reduced dimension and is designed to break or release the plastic screw upon force over a predetermined amount. Alternatively, a clip or other fastener might be employed within the spirit and scope of the present invention.

In the event of leakage or a rupture in the pipeline 20, escaping fluid under pressure will pass into the closed chamber and will cause an outward force on the cylinder formed by the material 36, causing the cylinder to distort. When the pressure exceeds a certain force, the fastener 50 will break or release causing the sheet 36 to move from the cylindrical position toward the normally flat or planar position. This will cause a wire or other mechanism which may be secured to the cylinder to be pulled from a magnetic proximity or reed switch 60. Various types of switches may be employed. In one known example, a pair of contacts on the ferrous metal reeds are normally closed. When the sheet moves, the contacts are opened.

The proximity switch is wired to and in communication with the actuator 18 and its controls so that the actuator will cause the valve 14 to close. Accordingly, the valve 14 will prevent gas or other fluid from continuing to escape.

As an additional optional measure, the proximity switch 60 may be connected and wired to an alarm 62 which may be local at the site of the valve 14 or may be remote.

FIG. 9 illustrates a side view of an alternate preferred embodiment of a leak detection system 70 for a pressurized pipeline which would be used in conjunction with a fluid control valve 14. FIG. 10 illustrates a sectional taken along section line 10-10 of FIG. 9. Fluid flow through the valve 14 would be in the direction shown by arrow 16. The valve 14 would operate with an actuator (shown in diagrammatic form) 90 which automates the operation of the valve.

Downstream from the valve 14 is a pipe or pipeline 20 so that fluid under pressure passing through the valve 14 passes into and through the pipeline 20.

As seen in the sectional view in FIG. 10, a split collar 72 is installed surrounding the outer circumference of the pipe downstream from the valve 14. The split collar 72 may be composed of two half circles held together by fasteners such as screws or bolts.

The present invention includes a normally flat, thin sheet of material 76 which is pliable and resilient. The material is normally flat or planar and has a pair of opposed ends which are brought together to form a cylinder as shown in the sectional view in FIG. 10. One opposed end includes a magnet 80 while the other opposed end includes a metallic keeper 82 of magnetic material, such as iron or nickel as best seen in FIG. 12. When the ends are brought together, the sheet of material 76 is retained in a cylindrical form. The cylindrical sheet of material is spaced from the pipeline 20 by one or more split collars 72, by the exit end of the valve 14, or by another mechanism so that a closed chamber is formed between the pipeline and the cylindrical sheet 76. Accordingly, the cylindrical material is spaced from the pipeline 20 and is coaxial therewith.

When the sheet of material 76 is brought from the flat or planar position into the cylindrical position, it has a spring force tending to move the sheet 76 back to the normally flat or planar position.

In the event of leakage or a rupture in the pipeline, escaping fluid under pressure will cause an outward force on the cylindrical sheet 76 causing the cylinder to distort. When the pressure exceeds a certain force, the magnetic force of the magnet and keeper will be overcome, causing the sheet to move from the cylindrical position back toward a normally flat or planar position.

This action will cause a magnetic reed switch 78 to be activated. The magnetic reed switch is in communication with the actuator 90 and its controls so that the actuator will cause the valve 14 to close. Accordingly, the valve will prevent gas or other fluid from continuing to escape.

In summary, the present invention provides a mechanism or means for detecting a leak in a pipeline which causes a signal to be transmitted to an actuator, causing a valve to close.

The present invention may be readily incorporated into new installations or retrofit to existing installations.

The present invention might be used in applications immediately downstream from a valve, wherever there are changes in diameter of a pipeline, downstream from an orifice meter, or wherever erosive forces in a pipeline are likely to occur.

Whereas, the present invention has been described in relation to the drawings attached hereto, it should be understood that other and further modifications, apart from those shown or suggested herein, may be made within the spirit and scope of this invention.

What is claimed is:

1. A leak detection system for a pressurized pipeline used in conjunction with a fluid control valve having a valve actuator, which system comprises:

a normally flat, thin sheet of material having a pair of opposed ends brought together to form a cylinder around said pipeline so that said sheet has a spring force from a cylindrical position to a normally flat position;

a seal between said cylinder and said pipeline to form a closed chamber around said pipeline;

at least one fastener to hold said ends of said sheet together in said cylindrical position unless a force overcomes said fastener;

a switch to detect movement of said cylinder toward said flat position; and a mechanism to connect said switch to said valve actuator to close said valve.

2. The leak detection system as set forth in claim 1 including at least one collar surrounding said pipeline.

3. The leak detection system as set forth in claim 2 wherein said at least one collar includes a pair of split collar halves joined together by screws and bolts.

4. The leak detection system as set forth in claim 1 wherein said at least one fastener includes a plastic screw dimensioned to be overcome by a force over a certain size.

5. The leak detection system as set forth in claim 1 wherein each of said pair of opposed ends of said sheet includes a receptacle having an opening therethrough so that said openings align to receive said at least one fastener therethrough.

6. The leak detection system as set forth in claim 1 wherein said force overcoming said fastener comprises fluid escaping from said pipeline into said closed chamber.

7. The leak detection system as set forth in claim 1 wherein said switch is a magnetic reed switch.

8. The leak detection system as set forth in claim 1 wherein said thin sheet of material is stainless steel.

9. The leak detection system as set forth in claim 1 including a mechanism to connect said switch to a remote alarm in order to generate a signal.

10. The leak detection system as set forth in claim 9 wherein said valve actuator is an electric valve actuator.

11. A leak detection system for a pressurized pipeline used in conjunction with a fluid control valve having a valve actuator, which system comprises:
  a normally flat, thin sheet of material having a pair of opposed ends brought together to form a cylinder around said pipeline so that said sheet has a spring force from a cylindrical position to a normally flat position;
  a seal between said cylinder and said pipeline to form a closed chamber around said pipeline;
  a magnet to hold said ends of said sheet together in said cylindrical position unless a force overcomes said magnet;
  a switch to detect movement of said sheet of material in said cylindrical position toward said flat position; and
  a mechanism to connect said switch to said valve actuator to close said valve.

12. The leak detection system as set forth in claim 11 including at least one collar surrounding said pipeline.

13. The leak detection system as set forth in claim 11 wherein said at least one collar includes a pair of split collar halves joined together by screws and bolts.

14. The leak detection system as set forth in claim 11 wherein said switch is a magnetic reed switch.

15. The leak detection system as set forth in claim 11 wherein said thin sheet of material is stainless steel.

16. The leak detection system as set forth in claim 11 wherein said force overcoming said magnet comprises fluid escaping from said pipeline into said closed chamber.

17. The leak detection system as set forth in claim 11 including a mechanism to connect said switch to a remote alarm to generate a signal.

* * * * *